US010549354B1

(12) United States Patent
Lankin

(10) Patent No.: US 10,549,354 B1
(45) Date of Patent: Feb. 4, 2020

(54) CONVERTIBLE CENTER DRILL

(71) Applicant: Andrew Lankin, Farmington Hills, MI (US)

(72) Inventor: Andrew Lankin, Farmington Hills, MI (US)

( * ) Notice: Subject to any disclaimer, the term of this patent is extended or adjusted under 35 U.S.C. 154(b) by 0 days.

(21) Appl. No.: 16/114,307

(22) Filed: Aug. 28, 2018

(51) Int. Cl.
*B23B 23/00* (2006.01)
*B23B 23/02* (2006.01)
*B23B 23/04* (2006.01)
*B23B 43/02* (2006.01)

(52) U.S. Cl.
CPC ............ *B23B 43/02* (2013.01); *B23B 23/005* (2013.01); *B23B 23/025* (2013.01); *B23B 23/045* (2013.01)

(58) Field of Classification Search
CPC ....... B23B 23/00; B23B 23/005; B23B 23/02; B23B 23/025; B23B 23/04; B23B 23/045
See application file for complete search history.

(56) References Cited

U.S. PATENT DOCUMENTS

| 707,573 | A | * | 8/1902 | Fleming | B23B 23/04 408/72 R |
|---|---|---|---|---|---|
| 2,481,939 | A | | 9/1949 | Miller | |
| 2,606,034 | A | | 8/1952 | Heldenbrand | |
| 2,944,455 | A | * | 7/1960 | Hultenius | B23B 23/04 82/150 |
| 2,994,131 | A | * | 8/1961 | Gaylord | B23B 51/10 33/520 |
| 3,606,563 | A | * | 9/1971 | Matsumoto | B23B 43/02 408/200 |
| 3,951,020 | A | | 4/1976 | Makarem | |
| 7,758,288 | B2 | * | 7/2010 | Takahashi | B23B 49/00 33/638 |

FOREIGN PATENT DOCUMENTS

| CN | 103192095 A | | 7/2013 | |
|---|---|---|---|---|
| CN | 106180766 A | | 12/2016 | |
| FR | 1204755 A | * | 1/1960 | ............. B23B 23/00 |
| FR | 2514276 A1 | * | 4/1983 | ............. B23B 23/00 |
| GB | 829991 A | * | 3/1960 | ........... B23B 23/025 |
| GB | 1226506 A | | 3/1971 | |

OTHER PUBLICATIONS

Quad Head Tailstock Turret Drill Chuck Center Die Holder Capstan located online at https://www.rdgtools.co.uk/acatalog/2MT-QUAD-HEAD-TAILSTOCK-TURRET-DRILL-CHUCK-CENTER-DIE-HOLDER-CAPSTAN---8693.html on Jun. 21, 2018.

\* cited by examiner

*Primary Examiner* — Nicole N Ramos
(74) *Attorney, Agent, or Firm* — Oppenhuizen Law PLC; David L. Oppenhuizen

(57) ABSTRACT

A center for use on a tailstock of a lathe is disclosed. The center comprises an elongated shaft having a proximal end to be secured in a tailstock of a lathe, and a distal end that includes a conical tip for insertion into a center hole in a workpiece. The center also comprises a pivotable arm having a proximal arm end that is rotatably and slidingly secured to the elongated shaft. The pivotable arm has a distal arm end that is rotatable into a position atop the conical tip. The distal arm end has a distal side that includes a center drill, and a proximal side that includes a recess that is seatable onto the conical tip. The conical tip and the center drill have the same rotational centerpoint when the distal arm end is positioned over the conical tip and the conical tip is placed within the recess.

18 Claims, 4 Drawing Sheets

CONVERTIBLE CENTER DRILL

FIELD OF THE PRESENT DISCLOSURE

The present disclosure relates generally to a center for use on a tailstock of a lathe; and, in particular, to a center which could be implemented as a regular center as well as a center drill, as desired.

BACKGROUND

Lathes are widely used to cut and remove tapers from shafts, tubes, and pipes, hereinafter collectively referred to as "workpieces." In a typical lathe, a workpiece is coupled between a chuck and a tailstock of the lathe. As the lathe rotates the workpiece, a tool post is advanced towards the chuck, removing material from the workpiece. If, however, the workpiece is not perfectly aligned between the chuck and the tailstock, then the tool post will cut a misaligned taper in the circumference of the workpiece.

To avoid this, the workpiece is first centered in the lathe. For this purpose, a tool known as a lathe center, often shortened to "center," is employed which is mounted in the tailstock of the lathe. To center a workpiece on a lathe, a center hole is first drilled at one end of the workpiece, and secondly the center is positioned in the hole so as to rotatably mount the workpiece in the lathe. The center is particularly useful to support long workpieces where the cutting forces could deflect the workpiece excessively, reducing the finish and accuracy of the workpiece, or creating a hazardous situation. Traditionally, the center hole is drilled by removing the center from the tailstock, and installing a center drill (having a bit) in its place. The workpiece is secured into the headstock chuck, and the lathe is turned on to rotate the workpiece at a relatively low speed. The center drill is then translated toward of the workpiece until the center drill has drilled a small hole in the end of the workpiece. The center drill is then backed out of the hole, and the center drill is replaced with the center. The center is then translated toward the workpiece until the conical tip at the end of the center is positioned within the drilled hole. The workpiece is thus secured in place, correctly aligned, and ready to be turned by the lathe. Such set-up is generally cumbersome as the user (operator) has to temporarily replace the center with the center drill, and then remove the center drill to reinstall the center, resulting in excessive effort and waste of time. Furthermore, moving the tailstock around excessively increases the chance that the hole in the workpiece may be misaligned.

It is an object of the present invention to provide a center for use on a tailstock of a lathe which permits a center hole to be drilled on the lathe itself, and permits the center to be located in the drilled hole in an improved, faster, and simplified manner.

SUMMARY

The present disclosure describes a center for use on a tailstock of a lathe. The center comprises an elongated shaft having a proximal end that is configured to be secured in a tailstock of a lathe, and a distal end that includes a conical tip that is configured for insertion into a center hole in a workpiece. The center also comprises a pivotable arm having a proximal arm end that is rotatably and slidingly secured to the elongated shaft. The pivotable arm has a distal arm end that is rotatable into a position atop the conical tip. The distal arm end has a distal side that includes a center drill, and a proximal side that includes a recess that is seatable onto the conical tip. The conical tip and the center drill have the same rotational centerpoint when the distal arm end is positioned over the conical tip and the conical tip is placed within the recess.

In one or more embodiments, two pivotable arms are provided, and the distal arm ends of each arm are joined together, and the proximal arm ends of each arm are secured to opposed sides of the elongated shaft.

In one or more embodiments, the proximal arm end includes a slotted through-hole, and the elongated shaft includes an outwardly extending member that is positioned within the slotted through-hole.

In one or more embodiments, the outwardly extending member is a fastener secured into a wall of the elongated shaft.

In one or more embodiments, the center is a dead center.

In one or more embodiments, the center is a live center.

In one or more embodiments, the center drill pivots along, and in the direction of, an axis that is parallel to an axis of the elongated shaft.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

For a more complete understanding of example embodiments of the present disclosure, reference is now made to the following descriptions taken in connection with the accompanying drawings in which.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, apparatuses and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced item. Moreover, various features are described which may be exhibited by some embodiments and not by others. Similarly, various requirements are described which may be requirements for some embodiments but not for other embodiments.

The embodiments are described herein for illustrative purposes and are subject to many variations. It is understood that various omissions and substitutions of equivalents are contemplated as circumstances may suggest or render expedient, but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Figure 1:
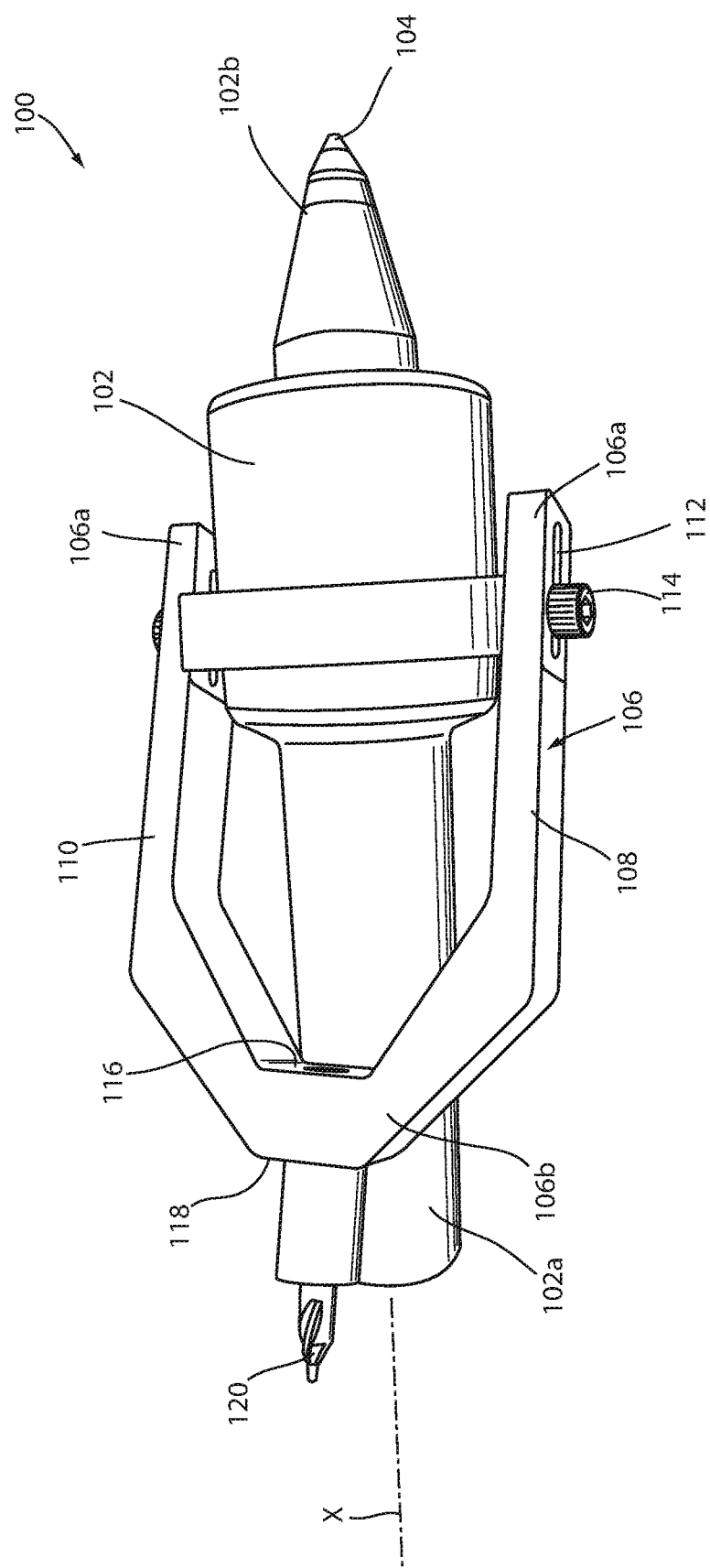
FIG. 1 illustrates a diagrammatic elevation view of a center being disposed in a configuration to be used as a regular center, in accordance with one or more embodiments of the present disclosure.
Figure 2:
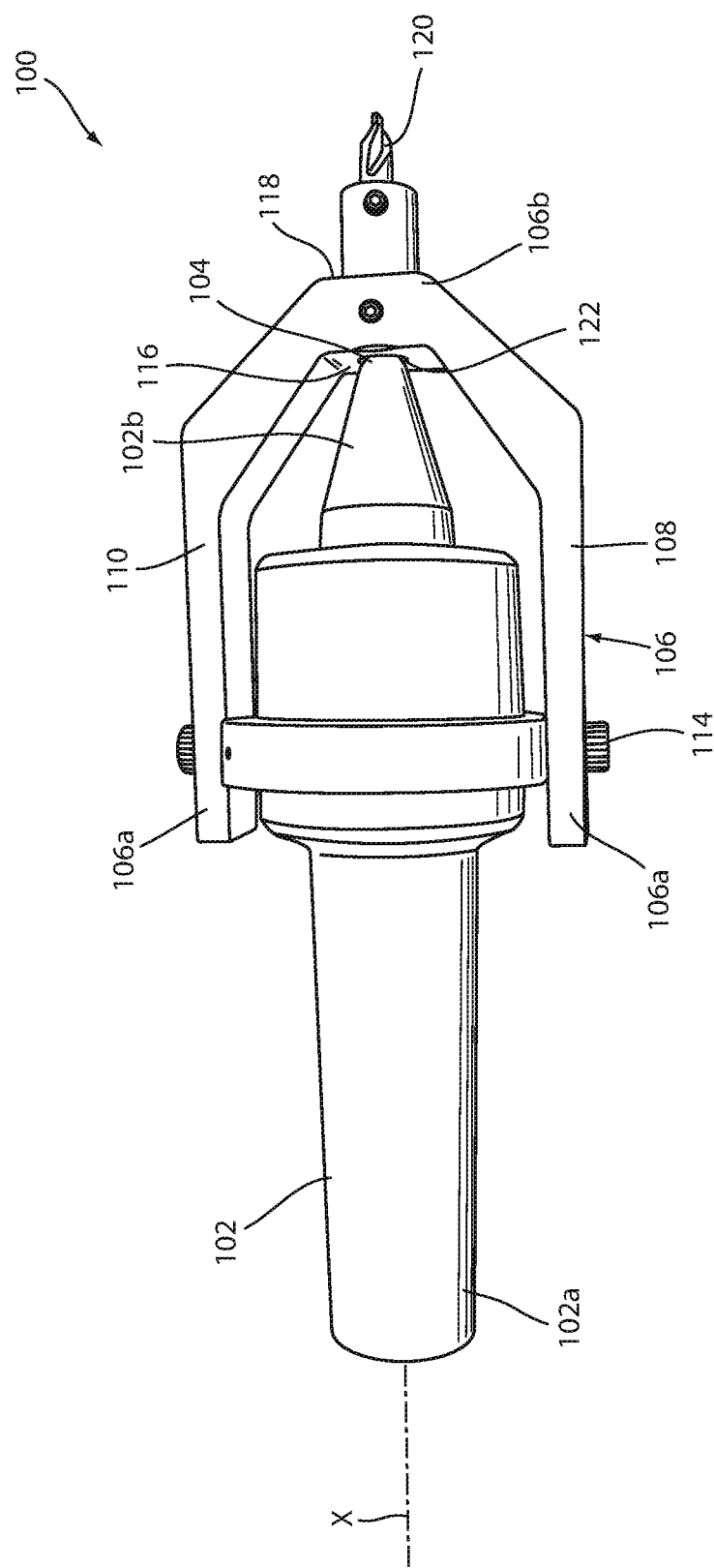
FIG. 2 illustrates a diagrammatic elevation view of the center being disposed in a configuration to be used as a center drill, in accordance with one or more embodiments of the present disclosure.

Referring to the drawings, FIGS. 1 and 2 illustrate front elevation views of a center (generally designated by the numeral 100), in accordance with embodiment(s) of the present disclosure. The center 100 is a work tool designed to be mounted in a tailstock of a lathe and similar machines (not shown herein). The center 100 is implemented to facilitate center drilling and centering operations on a workpiece to be turned, by eliminating required swapping of drills and centers or attachments therefor, specifically the steps of replacing a center by a center drill, centering the work, drilling, and replacing the drill by a center. Herein, the workpiece may generally be in the form of, but not limited to, a metallic cylindrical piece.

As illustrated, the center 100 includes an elongated shaft 102. The elongated shaft 102 may generally be cylindrical in shape and made of a metallic material, like steel. The elongated shaft 102 has a proximal end 102a that is configured (or designed) to be secured in a tailstock of a lathe. The cylindrical shape of the elongated shaft 102 may assist with mounting thereof in the tailstock. The elongated shaft 102 has a distal end 102b that includes a conical tip 104. As illustrated, the conical tip 104 is formed at a terminating portion of the distal end 102b. The conical tip 104 is configured for insertion into a center hole (once formed, as discussed later) in a workpiece for providing support thereto during operation. It may be understood that for such purpose, the conical tip 104 may generally have a taper of about 60°. It may be contemplated by a person skilled in the art that such elongated shaft 102 may be equivalent to a conventional center employed with lathes, as known in the art. In the illustrated embodiment of FIGS. 1 and 2, the elongated shaft 102 is shown to correspond to a live center (also known as rotating center) known in the art, with a bearing arrangement provided therewith. However, in other examples, the elongated shaft 102 may correspond to a dead center as known in the art without affecting the scope of the present disclosure.

The center 100 further includes a pivotable arm 106. The pivotable arm 106 may generally be an arrangement rotatably and slidingly secured with the elongated shaft 102. The pivotable arm 106 has a proximal arm end 106a and a distal arm end 106b. The proximal arm end 106a of the pivotable arm 106 is rotatably and slidingly secured to the elongated shaft 102; such that the pivotable arm 106 can pivot or rotate along an axis (such as, an elongated axis 'X') that is parallel to an axis of the elongated shaft 102, or in other words, about a lateral axis (that is orthogonal to the elongated axis 'X') of the elongated shaft 102; and further such that the pivotable arm 106 can slide along the elongated axis 'X'. It may be appreciated that the distal arm end 106b of the pivotable arm 106 is rotatable into a position atop the conical tip 104 (as shown in FIG. 2).

Figure 3:
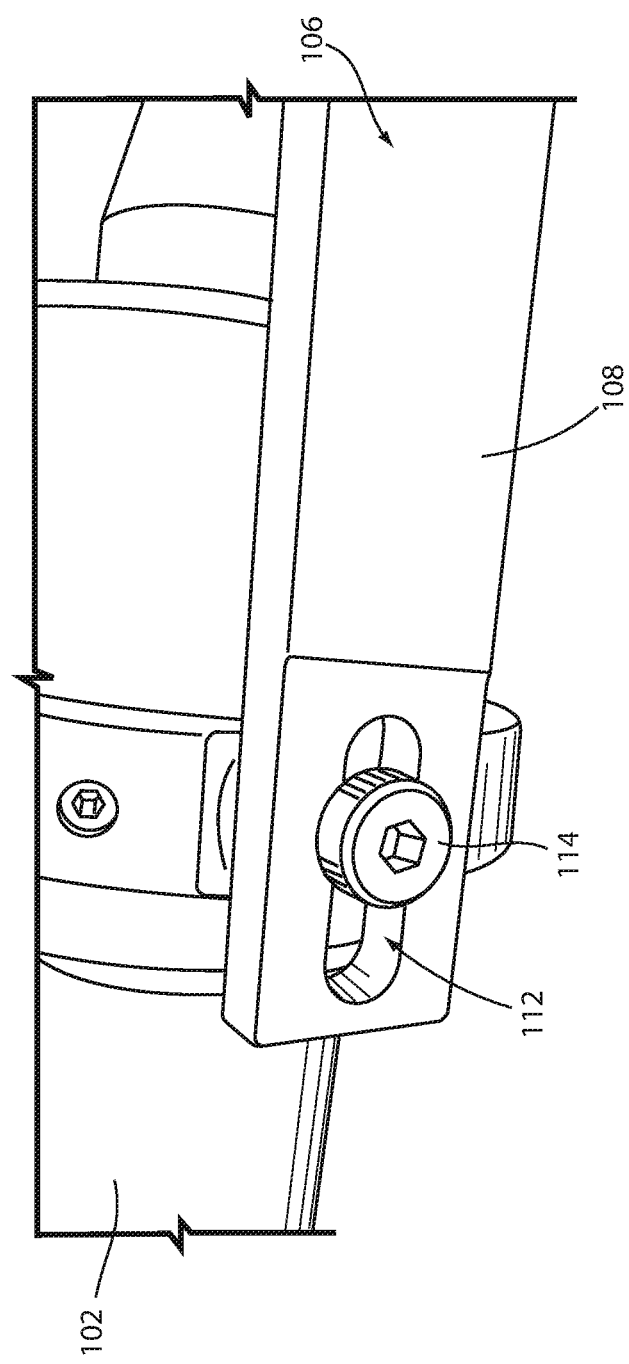
FIG. 3 illustrates a diagrammatic view of a portion of the center showing a slotted through-hole and outwardly extending member arranged therein, in accordance with one or more embodiments of the present disclosure.

Specifically, the arrangement of the pivotable arm 106 is provided with two pivotable arms 108 and 110, and the two pivotable arms 108 and 110 are joined together at the distal arm ends (i.e., the distal arm end 106b of the arrangement of the pivotable arm 106) of each pivotable arm 108 and 110. Further, the proximal arm ends (i.e., the proximal arm end 106a of the arrangement of the pivotable arm 106) of each arm 108 and 110 are secured to opposed sides (such as, lateral opposite sides in the illustrated view) of the elongated shaft 102. Each of the two pivotable arms 108 and 110 may include slotted through-holes 112 (as shown in FIG. 3) formed at the corresponding proximal arm ends 106a therein. The slotted through-holes 112 may, generally, extrude along the elongated axis 'X' when the distal arm end 106b of the pivotable arm 106 is rotatable into a position atop the conical tip 104 (as shown in FIG. 2).

Further, the elongated shaft 102 includes an outwardly extending member 114 that is positioned within the slotted through-hole 112 in order to dispose the pivotable arm 106 as rotatable and slidable with respect to the elongated shaft 102. Optionally, although not necessarily, optionally, although not necessarily the member 114 can include an enlarged head to help rotatably and slidably secure the pivotable arm 106 to the elongated shaft 102.

In one or more examples, the outwardly extending member 114 is a fastener secured into a wall (such as, lateral opposite sides in the illustrated view) of the elongated shaft 102. It may be understood that such fastener may be loosened in order to allow sliding of the pivotable arm 106 with respect to the elongated shaft 102, and simultaneously allow rotating of the pivotable arm 106 with respect to the elongated shaft 102, as desired. Further, such fastener may be tightened in order to prevent sliding and rotating of the pivotable arm 106 with respect to the elongated shaft 102. The fastener may also be a shoulder bolt, which is a type of bolt that is well-known to those having ordinary skill in the art.

Figure 4:
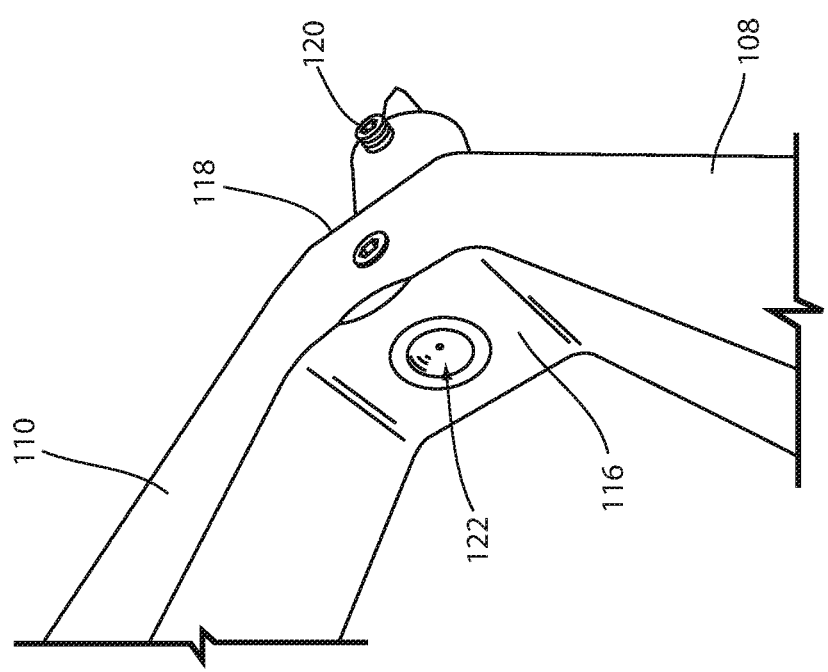
FIG. 4 illustrates a diagrammatic view of a portion of the center showing a recess formed therein, in accordance with one or more embodiments of the present disclosure.

Further, as illustrated in FIGS. 1 and 2, and also in FIG. 4, the distal arm end 106b of the pivotable arm 106 has a proximal side 116 and a distal side 118. In the present embodiments, the center 100 includes a center drill 120 provided at the distal side 118. The center drill 120 may be permanently attached to the distal side 118, or may be removable for sharpening purposes or the like. Further, as more clearly illustrated in FIG. 4, the proximal side 116 has a recess 122 formed therein. It may be understood that when the distal arm end 106b of the pivotable arm 106 is rotatable into a position atop the conical tip 104 (as shown in FIG. 2), the recess 122 is seatable onto the conical tip 104; or in other words, the conical tip 104 is inserted into the recess 122. It may be appreciated that for inserting the conical tip 104 into the recess 122 (from the configuration of the center 100 as shown in FIG. 1), first the outwardly extending member 114 as the fastener is loosened (if necessary), then the pivotable arm 106 is rotated, thereafter the pivotable arm 106 is adjusted by sliding in the slotted through-holes 112 such the recess 122 is engaged with the conical tip 104. Thus, the center drill 120 pivots and slides along the elongated axis 'X' (i.e. axis that is parallel to an axis of the elongated shaft 102), and is thereby retractable.

It will be appreciated that the center 100 of the present disclosure can be implemented as a regular center employed with lathes or similar machines, for example when disposed in the configuration as shown in FIG. 1. In one example, the center 100 could be implemented as a live center, such as in case when the elongated shaft 102 is of the design with a bearing arrangement as shown in the accompanying drawings. In an alternate example, the center 100 could be implemented as a dead center. In such a case, the elongated shaft 102 may not have the bearing arrangement therein and would have a shape corresponding to a regular dead center as known in the art (not shown herein). Further, it will be appreciated that the center 100 of the present disclosure can be implemented for forming, i.e. drilling a center hole in a workpiece, using the center drill 120, for example when the center 100 is disposed in the configuration as shown in FIG. 2.

The center 100 of the present disclosure can be adapted to any type of lathe or similar machines in which centering of a workpiece is required, and is equally applicable to headstocks and tailstocks. The center 100 is movable between two positions, the first position being in which the center 100 functions either as a live-center or as a dead-center (depending on the design of the elongated shaft 102), and the second position of which the center 100 functions as a center drill. The center 100 can be adapted to said two positions manually without the need of any tools, attachments or substitutions, and also without removing the elongated shaft 102 from the tailstock. With the center 100 of the present disclosure, the workpiece need only be mounted once, because the operations are carried out in sequence through a single set-up, the same tool being used as center drill, and thereafter selectively as a live-center or a dead-center, through manipulation (i.e. rotation) of the pivotable arm 106 therein. This helps to save time and effort on part of the user (operator).

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The exemplary embodiment was chosen and described in order to best explain the principles of the present disclosure and its practical application, to thereby enable others skilled in the art to best utilize the present disclosure and various embodiments with various modifications as are suited to the particular use contemplated.

What is claimed is:

1. A center for use on a tailstock of a lathe, the center comprising:
    an elongated shaft having a proximal end that is configured to be secured in a tailstock of a lathe, and a distal end that includes a conical tip that is configured for insertion into a center hole in a workpiece; and
    a pivotable arm having a proximal arm end that is rotatably and slidingly secured to the elongated shaft, the pivotable arm having a distal arm end that is rotatable into a position atop the conical tip, the distal arm end having a distal side that includes a center drill, and the distal arm end having a proximal side that includes a recess that is seatable onto the conical tip,
    whereby the conical tip and the center drill have the same rotational centerpoint when the distal arm end is positioned over the conical tip and the conical tip is placed within the recess; and
    wherein two pivotable arms are provided, and the distal arm ends of each arm are joined together, and the proximal arm ends of each arm are secured to opposed sides of the elongated shaft.

2. The center of claim 1, wherein the proximal arm end includes a slotted through-hole and the elongated shaft includes an outwardly extending member that is positioned within the slotted through-hole.

3. The center of claim 2, wherein the outwardly extending member is a fastener secured into a wall of the elongated shaft.

4. The center of claim 1, wherein the center is a dead center.

5. The center of claim 1, wherein the center is a live center.

6. The center of claim 1, wherein the center drill pivots along, and in the direction of, an axis that is parallel to an axis of the elongated shaft.

7. The center of claim 1, wherein the center drill is slidable along an axis that is parallel to an axis of the elongated shaft.

8. The center of claim 1, wherein the proximal arm end includes a slotted through-hole and the elongated shaft includes an outwardly extending member that is positioned within the slotted through-hole.

9. The center of claim 8, wherein the center is a dead center.

10. The center of claim 8, wherein the center is a live center.

11. The center of claim 2, wherein the center is a dead center.

12. The center of claim 2, wherein the center is a live center.

13. A center for use on a tailstock of a lathe, the center comprising:
    an elongated shaft having a proximal end that is configured to be secured in a tailstock of a lathe, and a distal end that includes a conical tip that is configured for insertion into a center hole in a workpiece; and
    a pivotable arm having a proximal arm end that is rotatably and slidingly secured to the elongated shaft, the pivotable arm having a distal arm end that is rotatable into a position atop the conical tip, the distal arm end having a distal side that includes a center drill, and the distal arm end having a proximal side that includes a recess that is seatable onto the conical tip, the proximal arm end having a slotted through-hole and the elongated shaft having an outwardly extending member that is positioned within the slotted through-hole;
    whereby the conical tip and the center drill have the same rotational centerpoint when the distal arm end is positioned over the conical tip and the conical tip is placed within the recess, and wherein the center drill pivots along, and in the direction of, an axis that is parallel to an axis of the elongated shaft.

14. The center of claim 13, wherein the center is a dead center.

15. The center of claim 13, wherein the center is a live center.

16. A center for use on a tailstock of a lathe, the center comprising:
    an elongated shaft having a proximal end that is configured to be secured in a tailstock of a lathe, and a distal end that includes a conical tip that is configured for insertion into a center hole in a workpiece; and
    a pivotable arm having a proximal arm end that is rotatably and slidingly secured to the elongated shaft, the pivotable arm having a distal arm end that is rotatable into a position atop the conical tip, the distal arm end having a distal side that includes a center drill, and the distal arm end having a proximal side that includes a recess that is seatable onto the conical tip, the proximal arm end having a slotted through-hole and the elongated shaft having an outwardly extending member that is positioned within the slotted through-hole;

whereby the conical tip and the center drill have the same rotational centerpoint when the distal arm end is positioned over the conical tip and the conical tip is placed within the recess, and wherein the center drill is slidable along an axis that is parallel to an axis of the elongated shaft.

17. The center of claim 16, wherein the center is a dead center.

18. The center of claim 16, wherein the center is a live center.

* * * * *